United States Patent
Hanashita et al.

[11] Patent Number: 5,840,651
[45] Date of Patent: Nov. 24, 1998

[54] PROCESS FOR THE PRODUCTION OF ACTIVATED COKE FOR SIMULTANEOUS DESULFURIZATION AND DENITRIFICATION

[75] Inventors: Kazuhiko Hanashita; Masahiro Matsuoka; Hiroyasu Suenaga; Katsuhiko Umeno; Toshihisa Yuda, all of Kitakyushu, Japan

[73] Assignee: Mitsui Mining Co., Ltd., Tokyo, Japan

[21] Appl. No.: 907,913

[22] PCT Filed: Nov. 18, 1994

[86] PCT No.: PCT/JP94/01943

§ 371 Date: Jul. 6, 1995

§ 102(e) Date: Jul. 6, 1995

[87] PCT Pub. No.: WO95/13868

PCT Pub. Date: May 26, 1995

Related U.S. Application Data

[63] Continuation of Ser. No. 481,350, Jul. 6, 1995, abandoned.

[30] Foreign Application Priority Data

Nov. 19, 1993 [JP] Japan ................................ 5-312757

[51] Int. Cl.$^6$ ........................................ B01J 20/02
[52] U.S. Cl. ................... 502/434; 502/433; 423/445 R; 423/460
[58] Field of Search ............... 44/591, 607; 423/445 R, 423/460; 502/180, 433, 434; 264/29.3, 29.7

[56] References Cited

U.S. PATENT DOCUMENTS

| | | | |
|---|---|---|---|
| 4,248,603 | 2/1981 | Weber et al. | 44/591 |
| 4,259,083 | 3/1981 | Ignasiak | 44/607 |
| 4,421,732 | 12/1983 | Komuro et al. | 502/418 |
| 5,118,655 | 6/1992 | Pedersen | 502/412 |
| 5,498,589 | 3/1996 | Schröter et al. | 502/433 |

*Primary Examiner*—Michael L. Lewis
*Assistant Examiner*—Stuart L. Hendrickson
*Attorney, Agent, or Firm*—Kanesaka & Takeuchi

[57] ABSTRACT

Disclosed is a process for the production of high-strength activated coke for desulfurization and denitrification. The process comprises forming a mixture of plural coals of different caking properties and a binder, said mixture containing said coal of higher caking property in an amount of 10–50 wt. %, subjecting the thus-formed mixture to oxidization treatment in an atmosphere having an oxygen concentration of 1–18 vol. % and a temperature of 50°–250° C., subjecting the thus-treated mixture to carbonization treatment under conditions of an oxygen concentration not higher than 8 vol. %, a heating efficiency of 10°–50° C./min and a final temperature 600°–900° C., and then subjecting again the thus-carbonized mixture to oxidation treatment at an oxygen concentration of 3–18 vol. % and a temperature of 200°–600° C. By treating the resultant high-strength activated coke for desulfurization and denitrification further with concentrated sulfuric acid, a coke which is inherently equipped with high denitrification activity can be obtained.

3 Claims, No Drawings

PROCESS FOR THE PRODUCTION OF ACTIVATED COKE FOR SIMULTANEOUS DESULFURIZATION AND DENITRIFICATION

This application is a continuation of application Ser. No. 08/481,350, filed Jul. 6, 1995, now abandoned.

TECHNICAL FIELD

This invention relates to a technique on an activated coke for simultaneous desulfurization and denitrification, and especially to a technique for producing a useful activated coke for concurrent desulfurization and denitrification, said coke being suitable for use as a denitrification catalyst in a dry desulfurization and denitrification process.

BACKGROUND ART

For the removal of sulfur oxides and nitrogen oxides which are contained in flue gas, many wet and dry, desulfurization and denitrification processes have been proposed and practiced. Among these desulfurization and denitrification processes, the dry processes have been attracting increasing interests in recent years owing to the merits that they do not require complex waste water treatment facilities, whose maintenance and control are difficult, and they do not need a large area for plant installation.

In these dry desulfurization and denitrification processes, various adsorbents and catalysts are employed. Among these, carbonaceous materials obtained by granulating or otherwise forming activated carbon as a principal raw material are used especially widely by using abilities for desulfurization and denitrification of the activated carbon.

As plants for practicing dry desulfurization and denitrification, those of the moving bed system have been predominantly adopted. In these plants, a carbonaceous adsorbent is generally recycled and reused. Conventional granulated or otherwise formed carbonaceous adsorbents are however accompanied by such practical problems to be resolved that they are low in compressive strength, abrasiveness, shatter strength and the like and are hence worn out or otherwise lost considerably when repeatedly used through adsorption and regeneration.

There is known, for example, a production process in which a coal, whose caking property has been eliminated by subjecting it beforehand to carbonization or oxidation treatment in a temperature range of 250°–600° C., is added and mixed with another coal having caking property and a binder to adjust the caking property, the resultant mixture is formed, the thus-formed material is carbonized at a temperature of 800°–900° C. (heating efficiency: 10° C./min or less) and an oxygen concentration of 0 vol. %, and the thus-carbonized formed material is then activated with steam at a temperature of 800°–900° C. to obtain an activated coke. By treating the coal in advance and hence eliminating its caking property, this process achieves prevention of deformation, breakage or the like of the formed material due to its expansion or the like in the carbonization step and also formation of uniform pores upon conversion into the activated coke. The activated coke obtained as described above, however, has contributed extremely little to an improvement in the denitrification efficiency despite the specific surface area has been increased by conducting the activation treatment.

Further, research and development work are under way on adsorptive carbonaceous materials to further enhance their desulfurization and denitrification performance. This approach include, for example, to increase surface functional groups on a carbonaceous material. This approach may be able to improve abilities for desulfurization and denitrification but, due to a substantial reduction in strength by the activating treatment itself, it can obtain only a low-strength carbonaceous adsorbent. On the other hand, carbonaceous adsorbents developed with a primary object focused at their strength are accompanied by the problem that their initial desulfurization and denitrification performance is not sufficient.

Also developed are those obtained by having a metal or the like carried on an activated coke so that their performance for nitrogen oxides have been enhanced. To employ them in a dry desulfurization and denitrification process of the moving bed system, however, their poisoning by sulfur oxides, worn-out or loss, reduction in performance after regeneration, and the like cannot be ignored.

In addition, techniques have also been studied and developed for obtaining an activated coke by adding a caking coal or a non-caking coal and also a binder. These techniques include, for example, processes in which a caking coal or a non-caking coal is crushed, formed without addition of a binder, oxidized and then carbonized (dry-distilled) and optionally, the product so obtained is activated further (Japanese Patent Laid-Open No. 69312/1990, Japanese Patent Laid-Open No. 55788/1990, etc.) as well as processes in which a mixture of a caking coal, a non-caking coal and a binder is formed, followed by oxidation and activation (Japanese Patent Laid-Open No. 129813/1988, etc.). There are also processes for the production of a desulfurizing carbon material, in which physical properties of a mixture of a caking coal, a non-caking coal and a binder are adjusted to have specific values (Japanese Patent Publication No. 17761/1988, etc.).

Despite various techniques have been studied to date as described above, even those obtained by these processes have low denitrification performance so that, even if they are activated cokes excellent in mechanical strength and desulfurization performance, they cannot still meet practical performance requirements for use in simultaneous desulfurization and denitrification.

From such a technical background, there is a long standing demand for an activated coke having high abilities for desulfurization and denitrification and, moreover, such high strength as being capable of withstanding recycled use in a dry desulfurization and denitrification process of the moving bed system.

DISCLOSURE OF THE INVENTION

With a view toward resolving the above-described technical problems, the present invention has as an object thereof the provision of a process for producing an activated coke which has high abilities for desulfurization and denitrification and, moreover, such high strength as being capable of withstanding recycled use in a dry desulfurization and denitrification process of the moving bed system.

As a result of an extensive investigation, the present inventors have found that an activated coke formed using a coal as a primary raw material, specifically, an activated coke having high abilities for desulfurization and denitrification and also sufficiently high strength can be obtained by blending coals as raw materials at a particular ratio from the standpoint of caking property, forming the coal blend and then treating the thus-formed coal blend under specific conditions, leading to the completion of the present invention.

The present invention therefore provides a process for the production of an activated coke for desulfurization and denitrification from coal as a principal raw material, which comprises adding a binder to a coal blend, said coal blend having been obtained by blending at least one coal of different caking property, the proportion of said coal of greater caking property being 10–50 wt. %; forming the resultant mixture; oxidizing the thus-formed material in an atmosphere having an oxygen concentration of 1–18 vol. % and a temperature of 50°–250° C.; carbonizing the thus-oxidized mixture at an oxygen concentration not higher than 8 vol. % and a heating efficiency of 10°–50° C./min to a final temperature 600°–900° C.; and then oxidizing the thus-carbonized formed material at an oxygen concentration of 3–18 vol. % and a temperature of 200°–600° C.

Further, two or more coals having high caking property can be used in the present invention. In this case, it is necessary to limit the proportion of the coal, which has the highest caking property, at 10–50 wt. %.

BEST MODE FOR CARRYING OUT THE INVENTION

In the present invention, at least two coals of different caking properties, which include at least one caking coal, are used as principal raw materials, and the proportion of the caking coal where only one caking coal is used or the proportion of the caking coal having the highest caking property where two or more caking coals are employed is set at 10–50 wt. %. Namely, upon blending coals, at least two coals of different caking properties are blended. Here, at least one caking coke is blended. Accordingly, the blend of two coals of different caking properties is either a combination of a caking coal and a non-caking coal or a combination of caking coals. The proportion of the caking coal in the former combination or the proportion of the coal having higher caking property in the latter combination is set at 10–50 wt. %.

It is of course possible to use plural, e.g., three or four coals of different caking properties. In this case, the proportion of the coal having the highest caking property is set at 10–50 wt. %.

Where the coal blend contains only one caking coal and its proportion is lower than 10 wt. % or where the coal blend contains two or more caking coals and the proportion of the caking coal having the highest caking property is lower than 10 wt. %, neither coal blends cannot provide a final product of high strength so that the object of the present invention cannot be attained. If their proportions exceed 50 wt. %, on the other hand, the formed materials are each caused to swell extraordinarily or fuse together during the carbonization step so that good products cannot be obtained.

Use of such a composition makes it possible to allow the coals to undergo oxidation to different extents in the subsequent oxidation step so that high strength can be retained after the carbonization.

The coals may be crushed in the form of a blend. As an alternative, coals which have already been crushed to a predetermined particle size may be blended. As the particle size of the coals, the particle diameter may preferably be 0.5 mm or smaller in view of formability, readiness in oxidation in the oxidization step, and the like.

Incidentally, coals are classified into brown coal, subbituminous coal, bituminous coal, anthracite, etc. in the increasing order of the degree of metamorphism. A coal having high caking property is primarily produced as bituminous coal in general. In each class, coals can also be classified according to caking property into non-caking coals and caking coals. The coal of high caking property, which is usable in the present invention, means the property determined based on a mutual relationship between coals to be used but does not mean the property determined independently with respect to a single coal.

The coals, which are to be used as raw materials in the above-described forming, are added and mixed with a binder. The resultant mixture is kneaded and formed into a formed coal. As the binder, one having stickiness, for example, tar, pitch, a resin, pulp mill waste water or the like can be used. The mass so mixed and kneaded is formed using, for example, a briquetting machine, a pelletizer, an extruder or the like, thereby obtaining a formed material having a particle diameter of approximately 5–20 mm.

The formed material so obtained is subjected to oxidation treatment for 10–180 minutes under conditions of an atmosphere having an oxygen concentration of 1–18 vol. % and a temperature of 50°–250° C. Depending on the composition of the coals, these conditions can be suitably set within the respective ranges. Where coals to be mixed are, for example, both caking coals and the proportion of the caking coal having higher caking property is above 20%, it may be sufficient to conduct oxidation treatment for 1 hour or so provided that the oxygen concentration is 12 vol. %. Upon conducting the oxidation treatment, a steam-containing gas or a flue gas may be used. The amount of the gas in this case may be 0.1–20 Nm$^3$/kg, preferably 0.5–5 Nm$^3$/kg based on the weight of the formed material on oxidation of the formed material, an oxygen concentration higher than 18 vol. % causes the oxidation to proceed so much that the reaction can be hardly controlled. Excess oxidation results in a carbonized formed material having low strength. An oxygen concentration lower than 1 vol. % however leads to insufficient oxidation, so that the formed material tends to swell or fuse together in the next carbonization step and cannot provide any product improved in desulfurization and denitrification activities. If the temperature of the atmosphere for this oxidation is lower than 50° C., the oxidation does not proceed sufficiently so that the formed material is caused to swell or fuse together. If the temperature conversely exceeds 250° C., the oxidation proceeds so much that the strength of the formed material is lowered. As a consequence, neither conditions meet the object of the present invention.

By subjecting the formed material to oxidation treatment under the above conditions, the caking property of the coal blend can be adjusted and an activated coke having high strength even after carbonization can be produced without occurrence of swelling or fused agglomeration of the formed material.

Regarding an apparatus for conducting the oxidation treatment in the above case, no particular limitation is imposed on its shape or type insofar as the above-described oxidizing conditions can be realized. For example, a rotary kiln, a multihearth oven, a fluidized bed kiln, a fixed bed oven, a vertical oven or the like can be used.

As conditions for the carbonization of the oxidized formed material, the carbonization can be carried out at an oxygen concentration of 8 vol. % or lower, preferably 3 vol. % or lower at a temperature of 600°–900° C. At this time, the heating efficiency is set at 10°–50° C./min, preferably 20°–40° C./min. A low heating efficiency results only in a carbonized product of low strength, eventually leading to an activated coke of insufficient strength. A high heating efficiency, on the other hand, lead to insufficient desulfurization and nitration performance. If the oxygen concentration exceeds 8 vol. %, combustion proceeds so much that the strength is lowered. Upon conducting the carbonization treatment, a steam-containing gas or a flue gas can also be used. The oxygen concentration may be 0 vol. % if possible.

The carbonized product so obtained is next subjected to oxidation treatment again for 40–200 minutes under conditions of an oxygen concentration of 3–18 vol. %, preferably 12–16 vol. % and a temperature of 200°–600° C., preferably 350°–500° C. The amount of the gas supplied here may be 0.1–20 Nm$^3$/kg based on the weight of the carbonized product. Upon conducting the oxidation treatment in this case, a steam-containing gas or a flue gas can also be used. In this second oxidation treatment, it is also difficult to control the reaction if the oxygen concentration exceeds 18 vol. %. It is however difficult to allow the reaction to proceed when the oxygen concentration is lower than 3 vol. %. By conducting this second oxidation treatment, the carbonized product is provided, as an activated coke for desulfurization and denitrification, with enhanced surface activities while retaining high strength, whereby activated coke excellent in both desulfurizing ability and denitrifying ability can be obtained even if its specific surface area is small.

The denitrification efficiency of the activated coke obtained as described above is gradually improved in its repeated use. If it is desired to produce an activated coke having a high denitrification efficiency from the beginning, this objective can be attained by treating an activated coke, which has been obtained as described above, further with concentrated sulfuric acid. In this case, the concentration of the concentrated sulfuric acid is about 50 to 100 wt. % or so and the time of the treatment is about 1–50 minutes or so. Regarding the manner of the treatment, the objective can be achieved by conducting dipping treatment at room temperature. If the dipping time is shorter than 1 minute, the denitrification efficiency is not substantially different from that available when the dipping is not conducted. A dipping time in excess of 50 minutes, on the other hand, results in an activated coke with reduced strength and is hence not preferred.

As has been described above, the present invention, compared with the conventional processes, has made it possible to very easily conduct the adjustment of caking property by the oxidation of the formed coal mixture, to conduct the oxidation and carbonization steps at lower treatment temperatures and further to increase the heating efficiency in the carbonization step. It is therefore possible to obtain an activated coke having high desulfurizing and denitrifying activities without causing a reduction in strength. Further, loads on treatment facilities can be reduced so that the treatment facilities can be constructed in smaller dimensions. These are advantages which the present invention can bring about.

In addition, it is unnecessary, different from the conventional art, to convert a coal as a raw material into a semi-coke in advance. The activated coke obtained in accordance with the present invention shows high denitrification performance even if its specific surface area is small. This seems to be attributable to the formation of surface functional groups on the surface of the activated coke by the oxidation treatment.

EXAMPLES

The present invention will hereinafter be described specifically by examples. It is however to be noted that these examples illustrate the best results and the technical scope of the present invention is hence not limited to the examples.

In the following examples, individual properties were measured by the following methods:

Adsorbed $SO_2$ amount

An activated coke (10 cc), whose particle size had been adjusted to 0.5–2.38 mm, was charged in a glass tube of 30 mm in inner diameter, through which a test gas having the following gas composition: $SO_2$: 20,000 ppm, $O_2$: 5%, $H_2O$: 10%, and $N_2$: balance was caused to flow at a temperature of 100° C. for 3 hours so that $SO_2$ was adsorbed. Desorption was then conducted at 400° C. for 1 hour in an $N_2$ atmosphere to determine the amount of $SO_2$ desorbed, which was then recorded as the adsorbed $SO_2$ amount.

Desulfurization efficiency

In a tubular testing apparatus whose inner diameter was 50 mm, 300 cc of an activated coke were filled, through which a test gas containing 1,000 ppm of $SO_2$, 5% of $O_2$ and 10% of $H_2O$ and balanced with $N_2$ was caused to flow at a temperature of 130° C. and a space velocity of 400 hr$^{31\ 1}$. The $SO_2$ concentration in the outlet gas was measured to determined the desulfurization efficiency.

Denitrification efficiency

In a tubular testing apparatus whose inner diameter was 50 mm, 300 cc of an activated coke were filled, through which a test gas containing 200 ppm of NO, 5% of $O_2$, 10% of $H_2O$ and 200 ppm of $NH_3$ and balanced with $N_2$ was caused to flow at a temperature of 130° C. and a space velocity of 400 hr$^{-1}$. The NO concentration in the outlet gas was measured to determined the denitrification efficiency.

Strength of activated coke

A Roga testing apparatus specified under JIS M 8801 was used. An activated coke (50 cc) of 6 mm and greater in size was placed in a rotary drum. After the rotary drum was driven 1,000 revolutions at a rate of 50 rpm, the contents were screened using a 6-mm sieve. The percentage of the plus sieve residue was determined and recorded as the Roga strength.

Caking property of coal The caking property of each coal was determined according to the Roga testing method specified under JIS M 8801.

Example 1

Sixty-nine parts by weight of a soft coking coal (Roga index: 47) having a volatile content of 34% and 17 parts by weight of a hard coking coal (Roga index: 76) having a volatile content of 20% were blended. After the coal blend was crushed to 0.5 mm or smaller, 14 parts by weight of a coal pitch were added. The resultant mixture was mixed and kneaded in a double arm kneader. The mass so obtained was formed by a briquetting machine into pieces of an almond shell shape of 17.5×13.5×9 mm in dimensions, whereby a formed material was obtained. After the formed material so obtained was oxidized at 170° C. and an $O_2$ concentration of 12% for 60 minutes in a rotary kiln, the thus-oxidized coal mixture was heated at a heating efficiency of 33° C./min and was maintained for carbonization at 850° C. for 15 minutes, so that a carbonized coal mixture was obtained. The resultant carbonized coal mixture was next oxidized at an $O_2$ concentration of 15% and 470° C. for 60 minutes, whereby an activated coke whose specific surface area and Roga strength were 111 m$^2$/g and 96%, respectively, was obtained.

Further, the adsorbed $SO_2$ amount, desulfurization. efficiency and denitrification efficiency by this activated coke were also determined according to the above-described methods. As a result, the adsorbed $SO_2$ amount, desulfurization efficiency and denitrification efficiency were found to be 40 mg/g, 63% and 55%, respectively.

Example 2

The procedures of Example 1 were repeated likewise except that the time of the oxidation treatment of the carbonized coal mixture was changed to 2 hours. An activated coke whose specific surface area and Roga strength were 185 m²/g and 95%, respectively, was obtained.

The adsorbed $SO_2$ amount, desulfurization efficiency and denitrification efficiency by this activated coke were determined according to the above-described methods. As a result, the adsorbed $SO_2$ amount, desulfurization efficiency and denitrification efficiency were found to be 50 mg/g, 66% and 67%, respectively.

Comparative Example 1

A soft coking coal (Roga index: 47) having a volatile content of 34%, which had been crushed to 0.5 mm or smaller, was heat-treated at 450° C. for 10 minutes, whereby a semi-coke was obtained. Twelve parts by weight of a coal pitch were added to 76 parts by weight of the semi-coke and 12 parts by weight of a hard coking coal (Roga index: 76) having a volatile content of 20%, said hard caking coal having been crushed to 0.5 mm or smaller, followed by mixing and kneading in a double arm kneader. The mass so obtained was formed by a briquetting machine into pieces of an almond shell shape of 17.5×13.5×9 mm in dimensions, whereby a formed coal mixture was obtained. The formed coal mixture so obtained was heated in an atmosphere containing 0% of $O_2$ at a heating efficiency of 8° C./min in a rotary kiln and was then maintained for carbonization at 850° C. for 30 minutes, so that a carbonized coal mixture was obtained. The resultant carbonized coal mixture was next activated by steam at 900° C. for 15 minutes, whereby an activated coke whose specific surface area and Roga strength were 150 m²/g and 95%, respectively, was obtained. The adsorbed $SO_2$ amount, desulfurization efficiency and denitrification efficiency of the thus-obtained activated coke were 50 mg/g, 50% and 35%, respectively. As has been demonstrated above, it is understood that an activated coke available from the conventional process has low denitrifying activity although its strength is high.

Comparative Example 2

Eighty-four parts by weight of a soft coking coal (Roga index: 47) having a volatile content of 34% and 4 parts by weight of a hard coking coal (Roga index: 76) having a volatile content of 20% were blended. After the coal blend was crushed to 0.5 mm or smaller, 12 parts by weight of a coal pitch were added. The resultant mixture was mixed and kneaded in a double arm kneader. The mass so obtained was formed by a briquetting machine into pieces of an almond shell shape of 17.5×13.5×9 mm in dimensions, whereby a formed coal mixture was obtained. After the formed coal mixture so obtained was oxidized at 170° C. and an $O_2$ concentration of 12% for 60 minutes in a rotary kiln, the thus-oxidized coal mixture was heated at a heating efficiency of 33° C./min and was maintained for carbonization at 850° C. for 15 minutes, so that a carbonized coal mixture was obtained. The resultant carbonized coal mixture was next oxidized at an $O_2$ concentration of 15% and 470° C. for 60 minutes, whereby an activated coke whose specific surface area and Roga strength were 126 m²/g and 88%, respectively, was obtained.

It is understood from the above results that even a blend of caking coals cannot provide an activated coke of high strength when the proportion of the caking coal of higher caking property does not fall within the range specified in the present invention. Further, the adsorbed $SO_2$ amount, desulfurization efficiency and denitrification efficiency of the thus-obtained activated coke were 52 mg/g, 71% and 58%, respectively.

Comparative Example 3

Sixty-nine parts by weight of a soft coking coal (Roga index: 47) having a volatile content of 34% and 17 parts by weight of a hard coking coal (Roga index: 76) having a volatile content of 20% were blended. After the coal blend was crushed to 0.5 mm or smaller, 14 parts by weight of a coal pitch were added. The resultant mixture was mixed and kneaded in a double arm kneader. The mass so obtained was formed by a briquetting machine into pieces of an almond shell shape of 17.5×13.5×9 mm in dimensions, whereby a formed coal mixture was obtained. After the formed coal mixture so obtained was oxidized at 170° C. and an $O_2$ concentration of 5% for 30 minutes in a rotary kiln, the thus-oxidized coal mixture was heated at a heating efficiency of 33° C./min and was maintained for carbonization at 850° C. for 15 minutes, so that a carbonized coal mixture was obtained. The resultant carbonized coal mixture was next oxidized at an $O_2$ concentration of 15% and 470° C. for 60 minutes, whereby an activated coke whose specific surface area and Roga strength were 70 m²/g and 96%, respectively, was obtained. Further, the adsorbed $SO_2$ amount, desulfurization efficiency and denitrification efficiency of the thus-obtained activated coke were 28 mg/g, 35% and 38%, respectively.

Example 3

The activated coke obtained in Example 1 was dipped at room temperature for 30 minutes in a 98% concentrated sulfuric acid solution and was then dried, whereby an activated coke improved in denitrification efficiency was obtained. An activated coke whose specific surface area and Roga strength as properties thereof were 158 m²/g and 96%, respectively, was obtained. Further, the adsorbed $SO_2$ amount, desulfurization efficiency and denitrification efficiency of the thus-obtained activated coke were 52 mg/g, 65% and 60%, respectively.

Comparative Example 4

After the activated coke obtained in Example 1 was dipped for 1 hour in a concentrated sulfuric acid solution, the thus-dipped activated coke was heat-treated at 400° C. for 1 hour in a nitrogen atmosphere, whereby an activated coke whose specific surface area and Roga strength as properties thereof were 168 m²/g and 93%, respectively, was obtained. Further, the adsorbed $SO_2$ amount, desulfurization efficiency and denitrification efficiency of the thus-obtained activated coke were 55 mg/g, 69% and 62%, respectively.

Comparative Example 5

The procedures of Example 1 were repeated likewise except that the oxidization treatment of the carbonized coal mixture was not conducted. An activated coke whose specific surface area and Roga strength were 36 m²/g and 97%, respectively, was obtained.

The adsorbed $SO_2$ amount, desulfurization efficiency and denitrification efficiency by this activated coke were found to be 9 mg/g, 21% and 22%, respectively. It is understood that an activated coke available from a process, in which oxidization treatment of a carbonized coal mixture is not conducted, is low in desulfurization and denitrification activities although it may have high strength.

Comparative Example 6

The procedures of Example 1 were repeated likewise except that the time of the oxidization treatment was changed to 30 minutes. An activated coke whose specific surface area and Roga strength were 81 m²/g and 96%, respectively, was obtained.

The adsorbed $SO_2$ amount, desulfurization efficiency and denitrification efficiency by this activated coke were found to be 27 mg/g, 44% and 41%, respectively. It is understood that, where the oxidation treatment of a carbonized coal mixture is insufficient, the resulting activated coke may have high strength but is low in desulfurization and denitrification activities although its desulfurization and denitrification activities are not so low as in Comparative Example 5.

Comparative Example 7

The procedures of Example 1 were repeated likewise except that the heating efficiency in the carbonization procedure was changed to 5° C./min. An activated coke whose specific surface area and Roga strength were 120 m²/g and 92%, respectively, was obtained.

It is understood from the above results that no high-strength activated coke can be obtained when the heating efficiency in the carbonization procedure is slow. Further, the adsorbed $SO_2$ amount, desulfurization efficiency and denitrification efficiency of the thus-obtained activated coke were 49 mg/g, 69% and 59%, respectively.

Comparative Example 8

The procedures of Example 1 were repeated likewise except that the heating efficiency in the carbonization procedure was changed to 100° C./min. An activated coke whose specific surface area and Roga strength were 75 m²/g and 96%, respectively, was obtained.

The adsorbed $SO_2$ amount, desulfurization efficiency and denitrification efficiency of the thus-obtained activated coke were 21 mg/g, 32% and 30%, respectively. It is hence understood that, where the heating efficiency is high in the carbonization procedure, the resulting activated coke is low in desulfurization and denitrification activities although it may have high strength.

CAPABILITY OF EXPLOITATION IN INDUSTRY

According to the present invention, upon production of an activated coke, at last two coals of different caking properties, including at least one caking coal, are blended to obtain a formed coal mixture, and the formed coal mixture is then subjected to oxidation treatment. This has obviated the need for conversion of coals as raw materials into a semi-coke in advance in the conventional production process for an activated coke. Further, the adjustment of caking property can be conducted very easily and the oxidation and carbonization steps can be practiced at low treatment temperatures. In addition, the heating efficiency of the carbonization step can be increased. It is therefore possible to obtain an activated coke having high desulfurization and denitrification activities without inducing a reduction in strength. Moreover, the present invention can also bring about the advantage that loads on treatment facilities can be reduced and the treatment facilities can thus be constructed in smaller dimensions.

We claim:

1. A process for production of a high-strength activated coke for desulfurization and denitrification from coal as a principal raw material, which comprises the steps of:

blending at least one caking coal and at least one non-caking coal or at least two caking coals of different caking properties to provides a coal blend 10–50 wt. % of said caking coal or caking coal of greater caking property and a diameter of 5–20 mm;

adding a binder to said coal blend to provide a mixture;

kneading said mixture to provide a kneaded mixture;

forming the resultant mixture in a briquetting machine, pelletizer, or extruder to provide a formed material having a diameter of 5–20 mm;

oxidizing said formed material in an atmosphere having an oxygen concentration of 1–18 vol. % and a temperature of 50°–250° C. for a period of 10–180 minutes, with a supply gas being 0.1–20 Nm³/kg based on said formed material to provide a oxidized mixture;

carbonizing said oxidized mixture at an oxygen concentration not higher than 8 vol. % and a heating efficiency of 20°–40° C./min to a final temperature 600°–900° C. to provide a carbonized mixture; and oxidizing said carbonized mixture in an atmosphere having an oxygen concentration of 12–16 vol. % and a temperature of 350°–500° C. for a period of 40–200 minutes, with a supply gas being 1–20 Nm³/kg based on said carbonized mixture.

2. A process for production of a high-strength activated coke for desulfurization and denitrification, which comprises:

forming a mixture of plural coals of different caking properties and a binder, said mixture containing a coal of higher caking property in an amount of 10–50 wt. % and having a diameter of no more than 0.5 mm;

kneading said mixture to provide a kneaded material;

forming said kneaded material in a briquetting machine, pelletizer, or extruder to provide a formed mixture having a diameter of 5–20 mm;

subjecting the thus-formed mixture to oxidization treatment in an atmosphere having an oxygen concentration of 1–18 vol. % and a temperature of 50°–250° C. for a period of 1–180 minutes, with a supply gas being 0.1–20 Nm³/kg based on said formed mixture to provide a treated mixture;

subjecting the thus-treated mixture to carbonization treatment under conditions of an oxygen concentration not higher than 8 wt. %, a heating efficiency of 20°–40° C./min and a final temperature 600°–900° C. provide a carbonized mixture; and then subjecting again the thus-carbonized mixture to oxidation treatment in an atmosphere having an oxygen concentration of 12–16 vol. % and a temperature of 350°–500° C. for period of 40–200 minutes, with a supply gas being 0.1–20 Nm³/kg based on said carbonized mixture.

3. A process for production of a high-strength activated coke for desulfurization and denitrification, which comprises:

forming a mixture of plural coals of different caking properties and a binder, said mixture containing a coal of higher caking property in an amount of 10–50 wt. % and having a diameter of no more than 0.5 mm;

kneading said mixture in a briquetting machine, pelletizer, or extruder to provide a formed mixture having a diameter of 5–20 mm;

subjecting the thus-formed mixture to oxidization treatment in an atmosphere having an oxygen concentration of 1–18 vol. % and a temperature of 50°–250° C. for a period of 10–180 minutes, with a supply gas being 0.1–20 Nm$^3$/kg based on said formed mixture;

subjecting the thus-treated mixture to carbonization treatment under conditions of an oxygen concentration not higher than 8 vol. %, a heating efficiency of 20°–40° C./min and a final temperature 600°–900° C.;

subjecting again the thus-carbonized mixture to oxidation treatment at an oxygen concentration of 12–16 vol. % and a temperature of 350°–500° C. for a period of 40–200 minutes, with a supply gas being 0.1–20 Nm$^3$/kg based on said carbonized mixture;

subjecting the thus-reoxidized mixture to dipping treatment for 1–50 minutes in concentrated sulfuric acid; and then drying the thus-dipped material.

* * * * *